United States Patent Office 3,833,645
Patented Sept. 3, 1974

3,833,645
PREPARATION OF 2-CHLOROETHANE-PHOSPHONIC ACID
Hans Theobald, Limburgerhof, and Karl Kiehs, Lampertheim, Germany, assignors to Badische Anilin- & Soda-Fabrik Aktiengesellschaft, Ludwigshafen (Rhine), Germany
No Drawing. Filed Apr. 16, 1973, Ser. No. 351,155
Int. Cl. C07f 9/38
U.S. Cl. 260—502.4 R                7 Claims

ABSTRACT OF THE DISCLOSURE

New process for the preparation of 2-chloroethanephosphonic acid by splitting the corresponding bis-2-chloroethyl ester.

---

The present invention relates to a new process for the production of 2-chloroethanephosphonic acid by splitting the corresponding bis-2-chloroethyl ester.

2-haloethanephosphonic acids, especially 2-chloroethanephosphonic acid, are well known as plant growth regulators (Dutch Patent Application No. 6802633). However, the prior art processes for preparing these compounds are not satisfactory because of very high operating and equipment costs and because the products obtained are not sufficiently pure. However, in the interests of the consumer only those products should be used as plant growth regulators for increasing plant and fruit crops which do not contain any impurities toxic to human beings.

It is known to produce 2-chloroethanephosphonic acid by hydrolysis of 2-chloroethanephosphonyl dichloride, which in turn is obtained by reacting $PCl_3$, ethylene and oxygen with or without a catalyst (German Laid-Open Applications DOS 2,032,135 and 1,103,922) or by reacting $POCl_3$ and ethylene (German Laid-Open Application DOS 2,032,136). However, these prior art processes involve high expenditure for equipment and only provide 2-chloroethanephosphonyl dichloride in very low yields (survey: L. Maier, Helv. Chim. Acta, 52, 1337 (1969)).

It is further known (German Laid-Open Application DOS 2,053,967) to prepare 2-chloroethanephosphonic acid from 2 - acyloxyethanephosphonic acids or esters thereof by reaction with anhydrous hydrogen chloride. This process is however unsatisfactory because a 2-chloroethanephosphonic acid containing 15 to 25% impurities is obtained from the starting compounds which are difficult to isolate in the pure state.

It is furthermore known to produce 2-chloroethanephosphonic acid by splitting the corresponding diesters only the splitting of the industrially easily accessible 2-chloroethanephosphonic bis-2-chloroethyl ester being of practical value. The prior art processes have however not provided satisfactory results because it has not yet been possible to split the ester quantitatively and considerably contaminated products are obtained in spite of at times high equipment costs. These impurities are most disadvantageous because they not only have a toxic effect on plants but constitute a potential danger to the consumer of plants and fruit treated with the compounds containing them.

A process is for instance known from German Laid-Open Applications DOS 1,768,061 and 1,768,219 which relates to the splitting of 2-chloroethanephosphonic bis-2-chloroethyl ester with anhydrous hydrogen chloride. It is however not possible to split the ester quantitatively in this manner as it has been found that the product thus obtained is considerably contaminated by the mono-2-chloroethyl ester of 2-chloroethanephosphonic acid. This monoester derivative, which is a potential source for the highly toxic 2-chloroethanol, stubbornly remains in the plant tissue for a long time and constitutes a considerable danger to the consumer because of its toxicity. These serious disadvantages are described in German Laid-Open Application DOS 2,050,245 are repeated in a later application, DOS 2,053,967.

According to a further process (German Laid-Open Application DOS 2,050,245) the 2 - chloroethanephosphonic bis-2-chloroethyl ester is split with concentrated hydrochloric acid. However, this process is satisfactory neither from the technical and economic viewpoint nor with regard to product purity. Ester splitting with concentrated hydrochloric acid not only requires extremely long reaction times, but also must be carried out under pressure necessitating the use of expensive corrosion-resistant equipment. The product prepared in this manner is contaminated not only by the toxic monoester derivative but also by the toxic 2-hydroxyethanephosphonic acid which forms as a result of the long reaction times by exchange of the 2-chloro radical for a hydroxy group. These disadvantages are disclosed in German Laid-Open Application DOS 2,053,967.

In contrast to the above-mentioned processes the process according to the invention, which may be carried out in a single reactor without elaborate apparatus, provides 2 - chloroethanephosphonic acid in almost quantitative yield and free from toxic impurities.

We have now found that 2-chloroethanephosphonic acid is obtained in a high degree of purity and approximately quantitative yield in the stagewise splitting of 2-chloroethanephosphonic bis-2-chloroethyl ester when splitting is carried out in a first stage with phosgene at 75° to 220° C. and in a second stage with anhydrous hydrogen chloride at 140° to 220° C. and the reaction product is subsequently treated with ice, water or steam at 10° to 200° C.

The starting material is 2-chloroethanephosphonic bis-2-chloroethyl ester which is easily obtainable by known methods from phosphorus trichloride and ethylene oxide (Houben-Weyl, Methoden der Organischen Chemie, XII/1, 443 (1963)). The ester prepared in this manner is treated in the first stage with phosgene and the reaction product is reacted without further purification direct with anhydrous hydrogen chloride and subsequently treated with water. This reaction sequence is illustrated for example by the following equations but it is not intended to rule out the possibility that, for instance, phosphonic anhydrides may be formed.

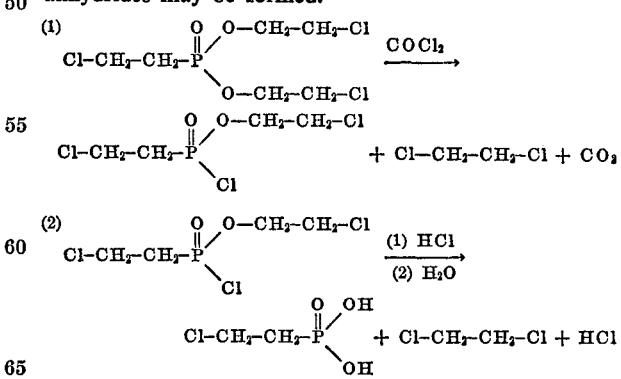

What is novel and extremely surprising is how easily the monochloride of 2-chloroethanephosphonic mono-2-chloroethyl ester may be split with anhydrous hydrogen chloride. After treatment with water 2-chloroethanephosphonic acid is obtained in almost quantitative yield, high purity and free from toxic impurities.

This stepwise splitting of the diester of 2-chloroethanephosphonic acid is advantageous because it can be carried out at atmospheric pressure and without changing the reactor, i.e., with a minimum of expenditure. The process of the invention therefore results in a considerable simplification of the prior art method. Of further advantage is the short reaction period required for splitting the ester with phosgene and anhydrous hydrogen chloride.

The process of the invention is generally carried out by preparing, by a prior art method, 2-chloroethane bis-2-chloroethyl ester and gassing it in the same reaction vessel with phosgene at 75° to 220° C., preferably 155° to 165° C., or at 175° C., for 4 to 6 hours. The crude product obtained in then treated, without further purification, at 140° to 220° C., preferably 155° to 165° C., for about 1 to 5 hours with anhydrous hydrogen chloride. During gassing with phosgene and anhydrous hydrogen chloride the 2-chloroethanephosphonic bis-2-chloroethyl ester is split and simultaneously the alcohol component of the ester is removed by distillation from the reaction vessel as 1,2-dichloroethane, the reaction equilibrium being shifted in favor of 2-chloroethanephosphonic acid. The 1,2-dichloroethane which has been removed from the reactor is collected in a separate flask. Unreacted phosgene or hydrogen chloride is recycled to the reaction vessel and thus fully utilized. Subsequent hydrolysis of the product with ice, water or steam proceeds exothermically, temperatures of from 10° to 200° C., preferably 60° to 150° C., being maintained.

The process of the invention is illustrated by the following examples.

EXAMPLE 1

549.4 g. of crude 2-chloroethanephosphonic bis-2-chloroethyl ester, prepared from phosphorus trichloride and ethylene oxide, was placed in a four-necked flask equipped with stirrer, thermometer, gas supply tube and cooler and gassed at 160° C., with phosgene. The 1,2-dichloroethane which evolved was removed by distillation from the reaction vessel and collected in a flask. After 5 to 6 hours no more 1,2-dichloroethane evolved. Anhydrous hydrogen chloride was now gassed into the reaction product at 160° C. until, after 4 to 5 hours, no more 1,2-dichloroethane distilled off. After cooling, about 1 liter of water was added in portions, the reaction temperature rising to about 50° C. The mixture was left for 30 minutes at 60° to 90° C.; water and hydrogen chloride were then drawn off at sub-atmospheric pressure. 2-chloroethanephosphonic acid having a melting point of 65° to 70° C. was obtained in 95% yield. Analysis of the crude product provided the following data:

Calc.: C, 16.6; H, 4.1; P, 21.5; Cl, 24.6. Found: C, 16.2; H, 4.2; P, 20.8; Cl, 23.3.

The nuclear resonance spectrum shows no further bands in addition to the absorption bands of pure 2-chloroethanephosphonic acid.

EXAMPLE 2

The procedure of Example 1 was adopted except that phosgene was gassed in at 175° C. for 5 to 6 hours. Only 1 hour was required for the subsequent treatment with anhydrous hydrogen chloride. The yield and purity are as in Example 1.

EXAMPLE 3

0.5 mole of 2-chloroethanephosphonic mono-2-chloroethyl ester monochloride which is presumed to be formed as an intermediate in Example 1 and is produced by the method of M. J. Kabachnik and P. A. Rossiikaya, Izvest. Akad. Nauk. S.S.S.R., Otdel. Khim. Nauk., *1946*, 295; red C. A., *42*, 7242i (1948), was treated at 160° C. with anhydrous hydrogen chloride and worked up as described in Example 1. The yield and purity are as in Example 1.

We claim:
1. A process for the production of 2-chloroethanephosphonic acid from 2-chloroethanephosponic bis-2-chloroethyl ester by splitting wherein splitting is carried out in a first stage with phosgene at 75° to 220° C., and in a second stage with anhydrous hydrogen chloride at 140° to 220° C., followed by treatment of the reaction product with ice, water or steam at 10° to 200° C.

2. A process as claimed in claim 1 wherein splitting of the 2-chloroethanephosphonic bis-2-chloroethyl ester with phosgene is carried out at 155° to 165° C.

3. A process as claimed in claim 1 wherein splitting of the 2-chloroethanephosphonic bis-2-chloroethyl ester with phosgene is carried out at 175° C.

4. A process as claimed in claim 1 wherein the stagewise splitting of 2-chloroethanephosphonic bis-2-chloroethyl ester is begun with phosgene and completed by treatment with anhydrous hydrogen chloride at 155° to 165° C.

5. A process as claimed in claim 1 wherein the reaction product, after the splitting of the 2-chloroethanephosphonic bis-2-chloroethyl ester with phosgene and anhydrous hydrogen chloride, is hydrolyzed with water at 60° to 150° C. to give 2-chloroethanephosphonic acid.

6. A process as claimed in claim 5 wherein 2-chloroethanephosphonic mono-2-chloroethyl ester monochloride is split with anhydrous hydrogen chloride at 155° to 165° C.

7. A process as claimed in claim 6 wherein the reaction product, after the splitting of 2-chloroethanephosphonic mono-2-chloroethyl ester monochloride with anhydrous hydrogen chloride, is hydrolyzed with water at 10° to 200° C., preferably 60° to 150° C., to give 2-chloroethanephosphonic acid.

References Cited

UNITED STATES PATENTS

| | | | |
|---|---|---|---|
| 3,167,574 | 1/1965 | Brown et al. | 260—986 |
| 3,200,048 | 8/1965 | Briggeman et al. | 260—986 |
| 3,600,345 | 8/1971 | Randall et al. | 260—502.4 P |
| 3,626,037 | 12/1971 | Randall et al. | 260—986 |
| 3,699,195 | 10/1972 | Randall et al. | 260—502.4 R |
| 3,775,410 | 11/1973 | Vogel | 260—502.4 R |

FOREIGN PATENTS

| | | | |
|---|---|---|---|
| 1,565,742 | 3/1969 | France | 260—502.4 R |

OTHER REFERENCES

Kabachnik et al.: "Chem. Abstracts," vol. 42 (1948), col. 7242.

Vogt: "Tetrahedron Letters," No. 15 (1970), pp. 1281–1284.

JOSEPH E. EVANS, Primary Examiner

U.S. Cl. X.R.

260—652 R, 960, 986; 424—198

UNITED STATES PATENT OFFICE
CERTIFICATE OF CORRECTION

PATENT NO. : 3,833,645
DATED : September 3, 1974
INVENTOR(S) : Hans Theobald et al It is certified that error appears in the above-identified patent and that said Letters Patent are hereby corrected as shown below:

In the heading insert -- Claims priority, application Germany, May 12, 1972, P 22 23 239.9 --.

Signed and Sealed this thirtieth Day of December 1975

[SEAL]

Attest:

RUTH C. MASON
Attesting Officer

C. MARSHALL DANN
Commissioner of Patents and Trademarks